United States Patent
Saruwatari

(10) Patent No.: US 9,019,610 B2
(45) Date of Patent: Apr. 28, 2015

(54) ZOOM LENS AND IMAGE PICKUP APPARATUS INCLUDING THE ZOOM LENS

(75) Inventor: Hiroshi Saruwatari, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 162 days.

(21) Appl. No.: 13/142,636

(22) PCT Filed: Jan. 6, 2010

(86) PCT No.: PCT/JP2010/000052
§ 371 (c)(1),
(2), (4) Date: Jun. 29, 2011

(87) PCT Pub. No.: WO2010/079750
PCT Pub. Date: Jul. 15, 2010

(65) Prior Publication Data
US 2011/0273774 A1   Nov. 10, 2011

(30) Foreign Application Priority Data

Jan. 7, 2009   (JP) ................................. 2009-001446

(51) Int. Cl.
*G02B 27/64* (2006.01)
*G02B 15/14* (2006.01)
*G02B 15/173* (2006.01)
*G02B 9/34* (2006.01)
*G02B 13/12* (2006.01)

(52) U.S. Cl.
CPC .............. *G02B 15/173* (2013.01); *G02B 15/14* (2013.01); *G02B 27/646* (2013.01); *G02B 9/34* (2013.01); *G02B 13/12* (2013.01)

(58) Field of Classification Search
CPC ........ G02B 15/00; G02B 15/14; G02B 15/16; G02B 27/64; G02B 27/646

USPC .................................. 359/557, 676, 686–687
See application file for complete search history.

(56) References Cited

U.S. PATENT DOCUMENTS

| 6,462,886 B1 * | 10/2002 | Hagimori ...................... 359/687 |
| 7,190,529 B2 | 3/2007 | Miyajima et al. |
| 7,206,137 B2 * | 4/2007 | Nakatani et al. .............. 359/687 |
| 7,253,965 B2 * | 8/2007 | Shibayama et al. .......... 359/687 |
| 7,382,549 B2 * | 6/2008 | Miyajima ..................... 359/686 |
| 7,796,346 B2 * | 9/2010 | Chang ........................... 359/687 |
| 2006/0146417 A1 | 7/2006 | Hoshi |

(Continued)

FOREIGN PATENT DOCUMENTS

JP        8248319 A      9/1996
JP     2006106191 A      4/2006

(Continued)

*Primary Examiner* — Thong Nguyen
(74) *Attorney, Agent, or Firm* — Canon USA Inc. IP Division

(57) ABSTRACT

A zoom lens includes, in order from an object side to an image side, a first lens unit having a positive refractive power, a second lens unit having a negative refractive power, a third lens unit having a positive refractive power, and a fourth lens unit having a positive refractive power. In the zoom lens, each lens unit moves to perform zooming. In addition, an amount of movement Mm of the fourth lens unit when zooming from a wide angle end to an intermediate zooming position, an amount of movement Mt of the fourth lens unit when zooming from the wide angle end to a telephoto end, a focal length fw of an entire system at the wide angle end, and focal lengths f3 and f4 of the respective third lens unit and fourth lens unit are properly set.

9 Claims, 13 Drawing Sheets

(56) References Cited

U.S. PATENT DOCUMENTS

| | | | |
|---|---|---|---|
| 2007/0297068 A1* | 12/2007 | Ohashi | 359/689 |
| 2008/0291547 A1* | 11/2008 | Saruwatari | 359/687 |
| 2009/0040624 A1* | 2/2009 | Shinohara | 359/687 |
| 2010/0177217 A1* | 7/2010 | Yamada et al. | 348/240.3 |

FOREIGN PATENT DOCUMENTS

| | | |
|---|---|---|
| JP | 2007-003554 A | 1/2007 |
| JP | 2008-026837 A | 2/2008 |
| JP | 2008-185782 A | 8/2008 |
| JP | 2008-292733 A | 12/2008 |

\* cited by examiner

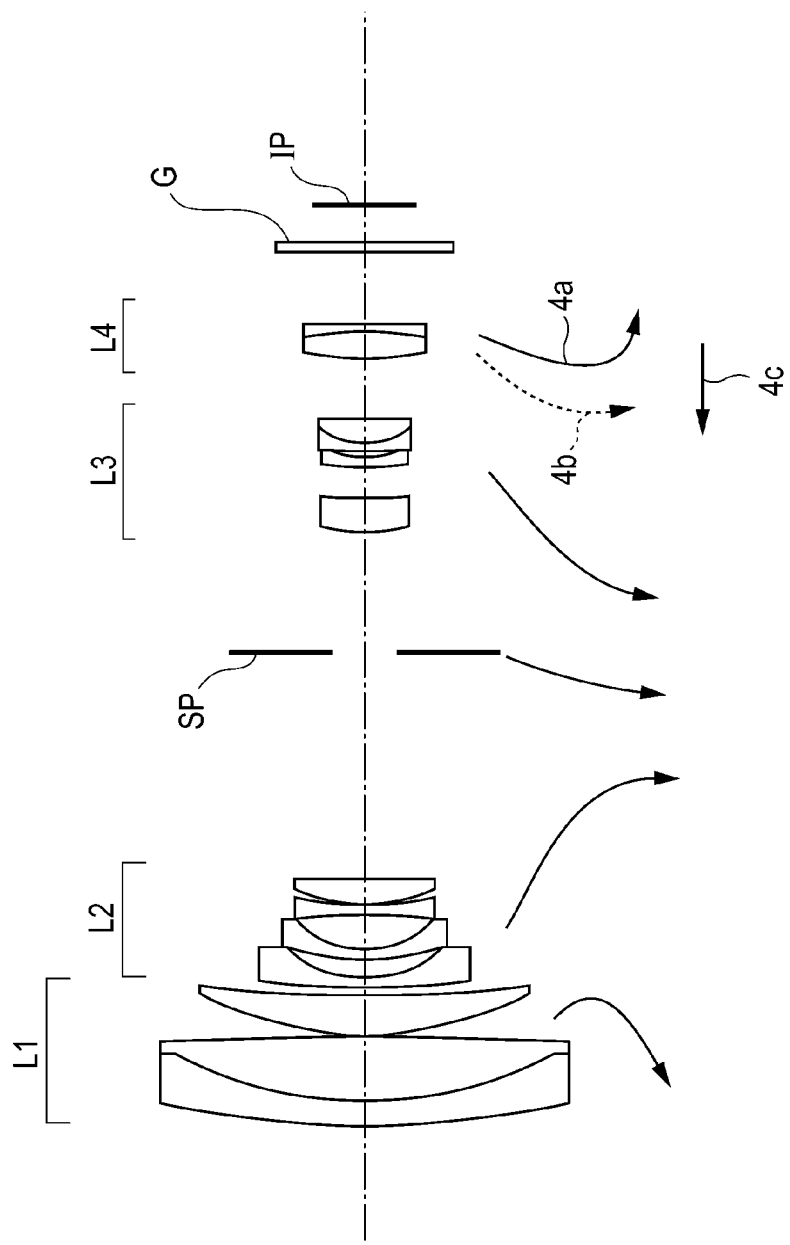

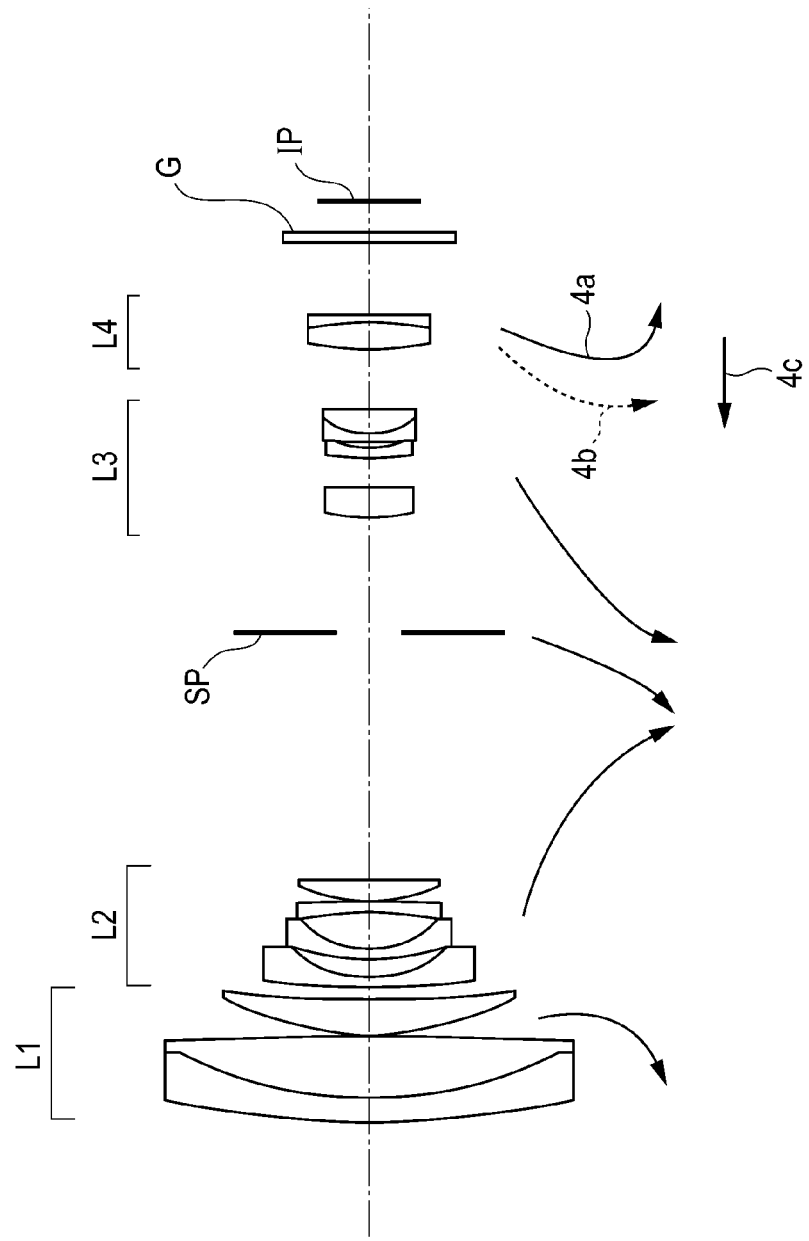

ZOOM LENS AND IMAGE PICKUP APPARATUS INCLUDING THE ZOOM LENS

TECHNICAL FIELD

The present invention relates to a zoom lens and an image pickup apparatus including the zoom lens, and to, for example, a video camera, an electronic still camera, a broadcasting camera, and a camera for silver halide photography.

BACKGROUND ART

In an image taking optical system constituting an image pickup apparatus, a zoom lens is required to have a short overall lens length (distance from a first lens surface to an image plane), to be compact, to have high resolution, and to have a high zoom ratio. In addition, the zoom lens is required to have a wide angle of view and a short focal length at a wide angle end so that a wide image taking range can be obtained even if an image taking distance is short.

In general, in order to reduce the size of the zoom lens while achieving a high zoom ratio, the number of lenses may be reduced while the refractive power of each lens unit making up the zoom lens is increased. However, if the refractive power of each lens surface is increased, it becomes difficult to correct various aberrations.

If, for compactly accommodating each lens unit when an image is not taken, a structure that allows each lens unit to be collapsed is used, an assembly error, such as falling of the lenses and the lens units, tends to increase. Here, if the sensitivities of the lenses and the lens units are high, optical performance is reduced. Therefore, it is desirable that sensitivities with respect to decentering of the lenses and the lens units in the zoom lens be small.

Hitherto, a four-unit zoom lens including, in order from an object side to an image side, a first lens unit having a positive refractive power, a second lens unit having a negative refractive power, a third lens unit having a positive refractive power, and a fourth lens unit having a positive refractive power is known.

U.S. Pat. No. 7,190,529 discusses a zoom lens having a zoom ratio of approximately 10. In this zoom lens, a change in lateral magnification of a second lens unit during zooming is small. Therefore, if, in order to further increase the zoom ratio, the refractive power of the second lens unit is increased or the burden of varying magnification allotted to the other lens units is increased, it is difficult to restrict variations in aberrations during zooming.

U.S. Pat. No. 7,206,137 discusses a zoom lens having a zoom ratio of approximately 15 to 20. However, measures for solving problems regarding various aberrations, such as curvature of field and off-axis color flare when widening the angle of view, are not satisfactorily discussed.

Japanese Patent Laid-Open No. 2007-003554 discusses a zoom lens having a zoom ratio of approximately 18. This zoom lens has a high zoom ratio and a wide angle of view. However, the amount by which a first lens unit is moved out is relatively large. Therefore, in order to reduce the overall lens length when the lens unit is collapsed, a lens barrel needs to be a multi-step lens barrel, as a result of which the structure of the lens barrel becomes complicated.

US Patent Application Publication No. 2006/0146417 discusses a zoom lens that corrects image blur by vibrating the entire third lens unit perpendicularly to an optical axis.

If the aforementioned four-unit zoom lens is reduced in size, the effective diameter of the first lens unit is strongly influenced by incidence height of off-axis light with respect to a lens surface in a region extending from a wide angle end to an intermediate zooming area. Therefore, in order to reduce the size of the zoom lens, it becomes important to suitably set the refractive power of each lens unit, the amount of movement during zooming, and a movement locus including the intermediate zooming area.

CITATION LIST

Patent Literature

PTL 1: U.S. Pat. No. 7,190,529
PTL 2: U.S. Pat. No. 7,206,137
PTL 3: Japanese Patent Laid-Open No. 2007-003554
PTL 4: US Patent Application Publication No. 2006/0146417

SUMMARY OF INVENTION

A zoom lens according to the present invention includes a first lens unit having a positive refractive power, a second lens unit having a negative refractive power, a third lens unit having a positive refractive power, and a fourth lens unit having a positive refractive power. The first lens unit, the second lens unit, the third lens unit, and the fourth lens unit are disposed in that order from an object side to an image side. In the zoom lens, each lens unit moves to perform zooming. In addition, the following conditions are satisfied:

$$1.8 < (|Mm| + |Mt|)/fw < 4.0$$

$$0.65 < f3/f4 < 1.0$$

where a focal length of an entire system at a wide angle end is fw, a focal length of the entire system at a telephoto end is ft, a focal length fm of the entire system at an intermediate zooming position is $fm = (fw * ft)^{1/2}$, an amount of movement of the fourth lens unit when zooming from the wide angle end to the intermediate zooming position is Mm, an amount of movement of the fourth lens unit when zooming from the wide angle end to the telephoto end is Mt, and focal lengths of the third lens unit and the fourth lens unit are f3 and f4, respectively.

According to the present invention, it is possible to provide a zoom lens having a wide angle of view and a high zoom ratio and having good optical performance over the entire zooming range by suitably setting the refractive power and the amount of movement of each lens unit during zooming.

BRIEF DESCRIPTION OF DRAWINGS

FIG. 1 is a sectional view of lenses at a wide angle end according to a first embodiment of the present invention.

FIG. 5 is a sectional view of lenses at the wide angle end according to a third embodiment of the present invention.

DESCRIPTION OF EMBODIMENTS

A zoom lens according to the present invention includes, in order from an object side to an image side, a first lens unit having a positive refractive power, a second lens unit having a negative refractive power, a third lens unit having a positive refractive power, and a fourth lens unit having a positive refractive power. The zoom lens is one in which each lens unit moves during zooming.

Figure 2A:
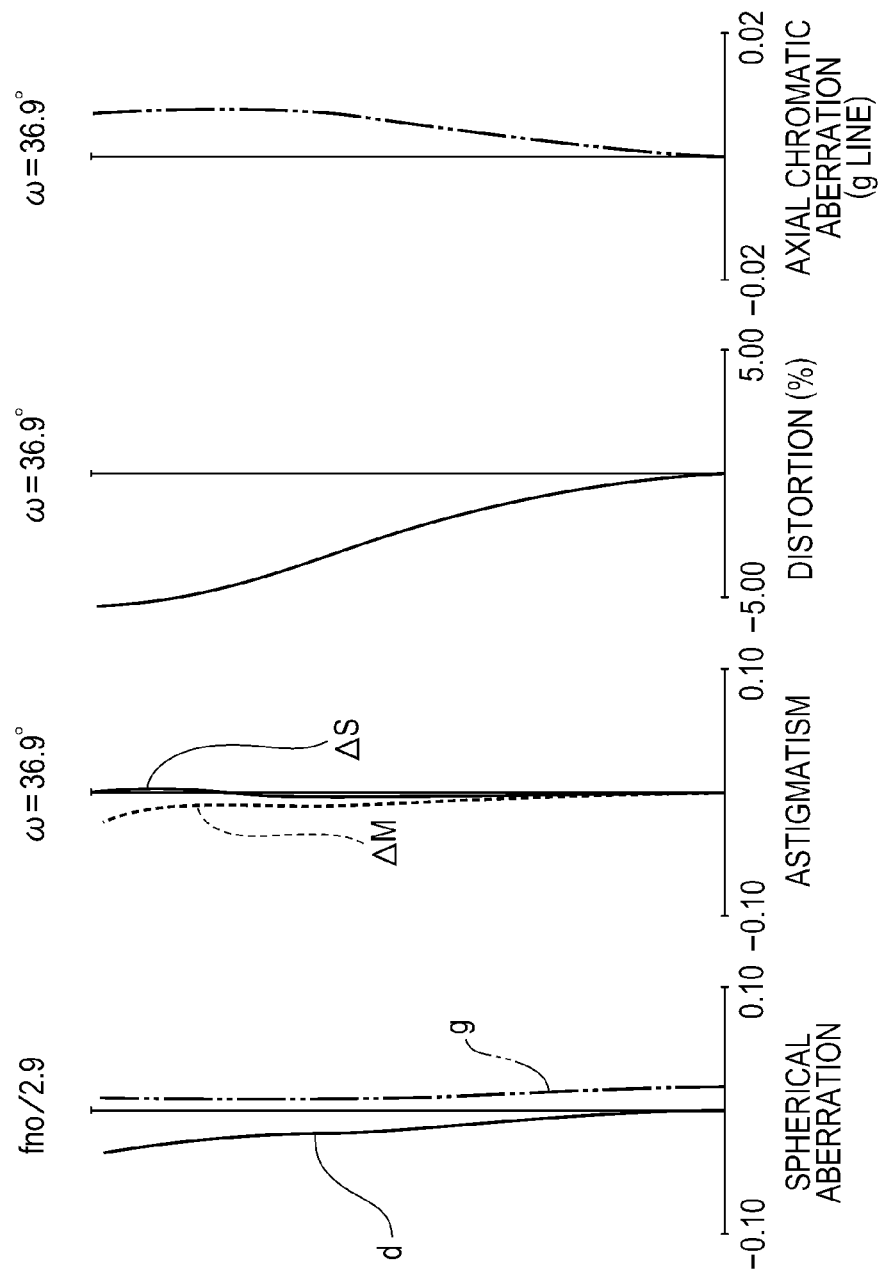
FIG. 2A shows aberrations at the wide angle end according to the first embodiment of the present invention.
Figure 2B:
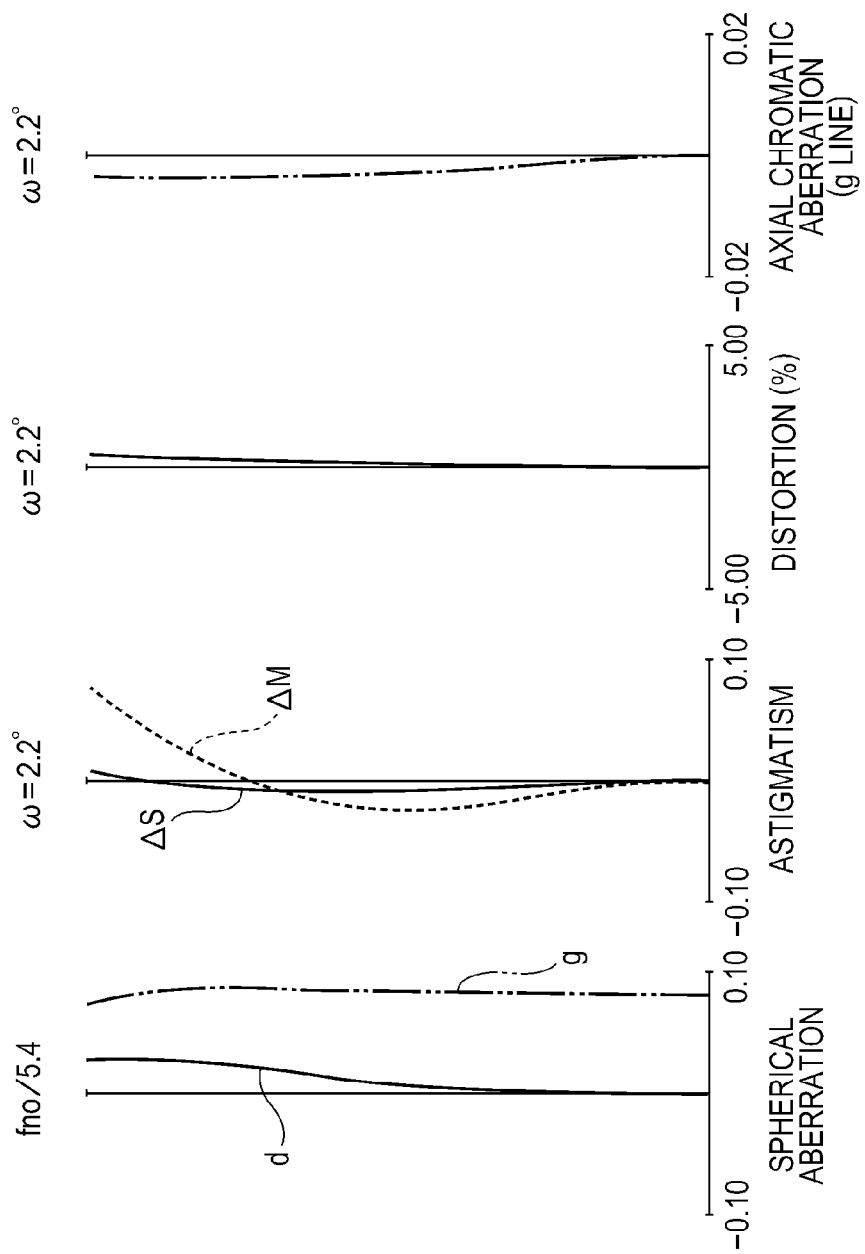
FIG. 2B shows aberrations at the telephoto end according to the first embodiment of the present invention.

FIG. 1 is a sectional view of lenses at a wide angle end (short focal length end) of a zoom lens according to a first embodiment of the present invention. FIGS. 2A and 2B show aberrations at the wide angle end and a telephoto end (long focal length end) of the zoom lens according to the first embodiment, respectively.

Figure 3:
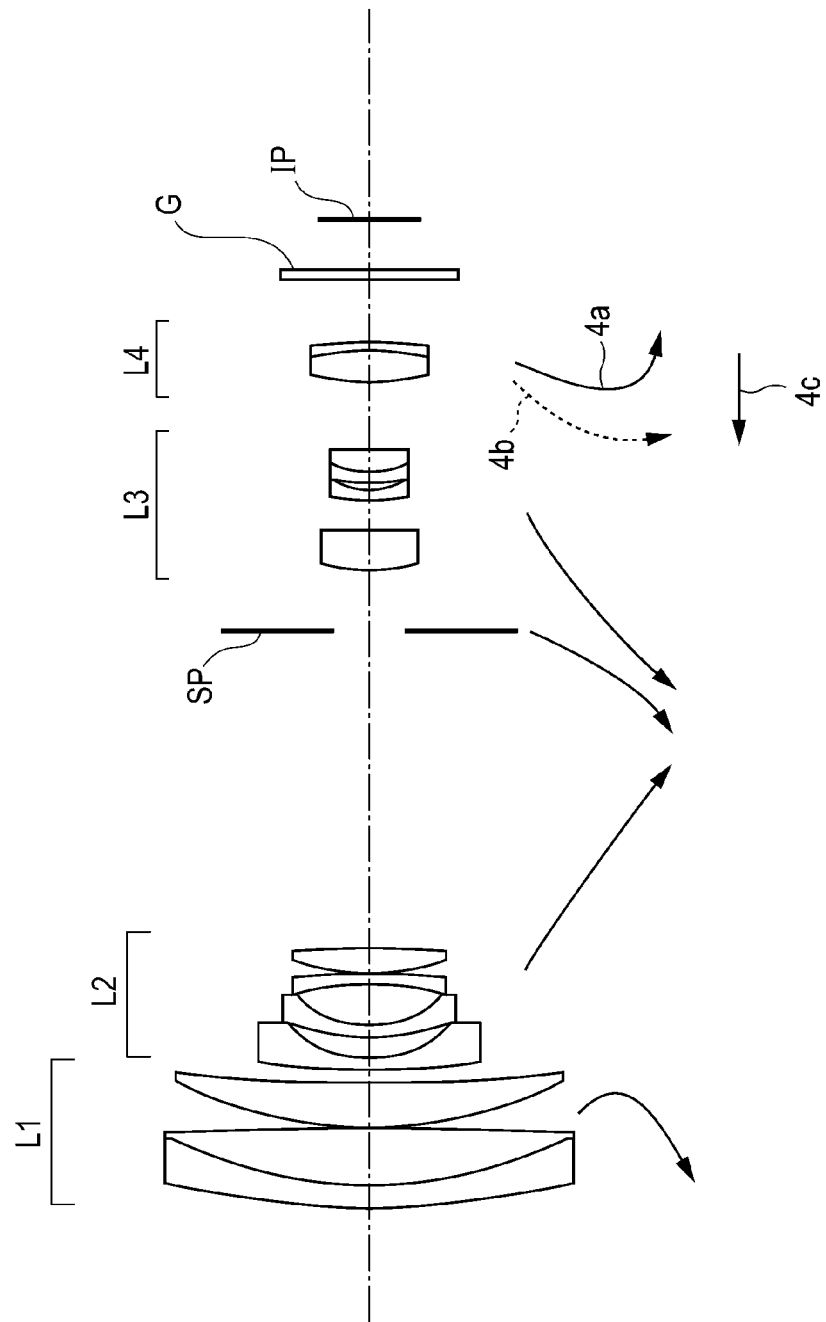
FIG. 3 is a sectional view of lenses at the wide angle end according to a second embodiment of the present invention.
Figure 4A:
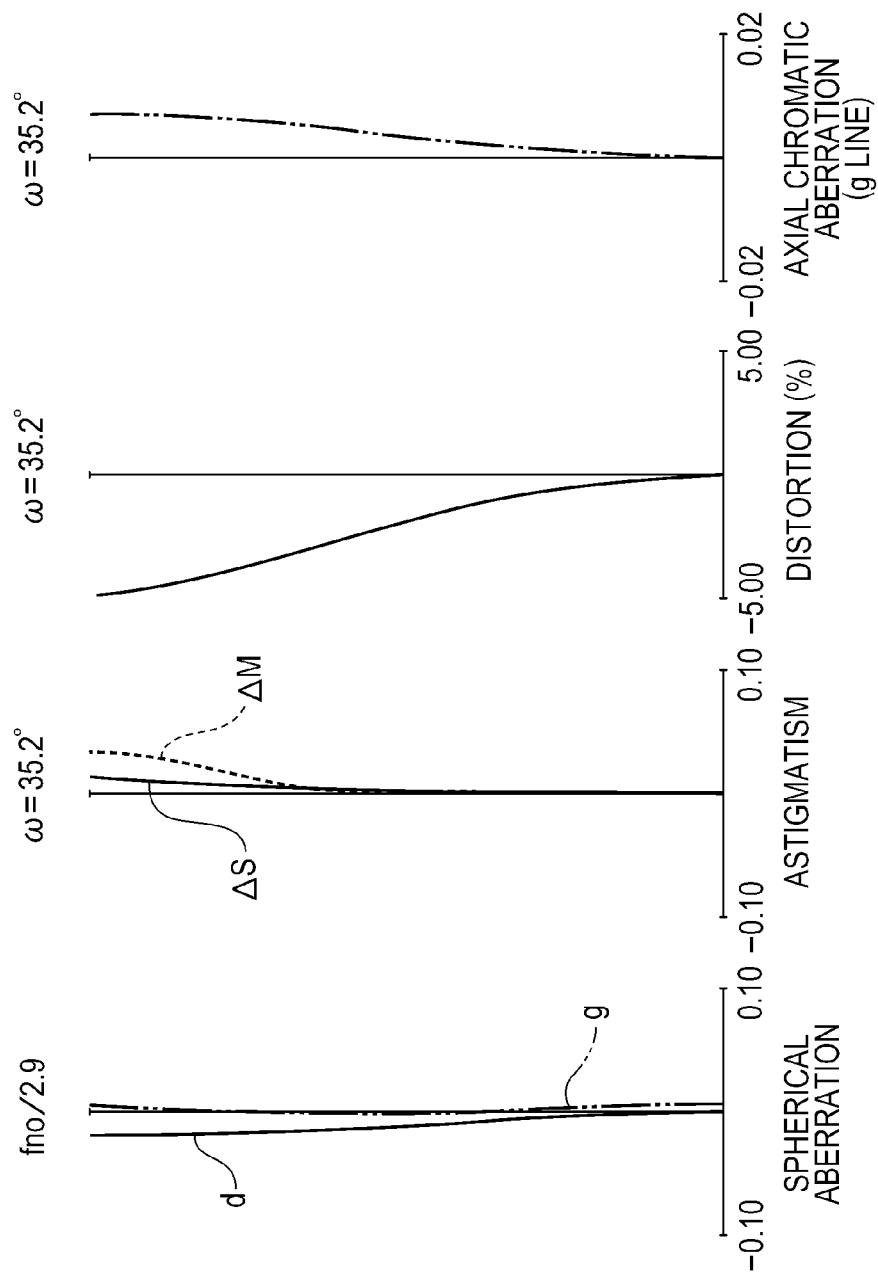
FIG. 4A shows aberrations at the wide angle end according to the second embodiment of the present invention.
Figure 4B:
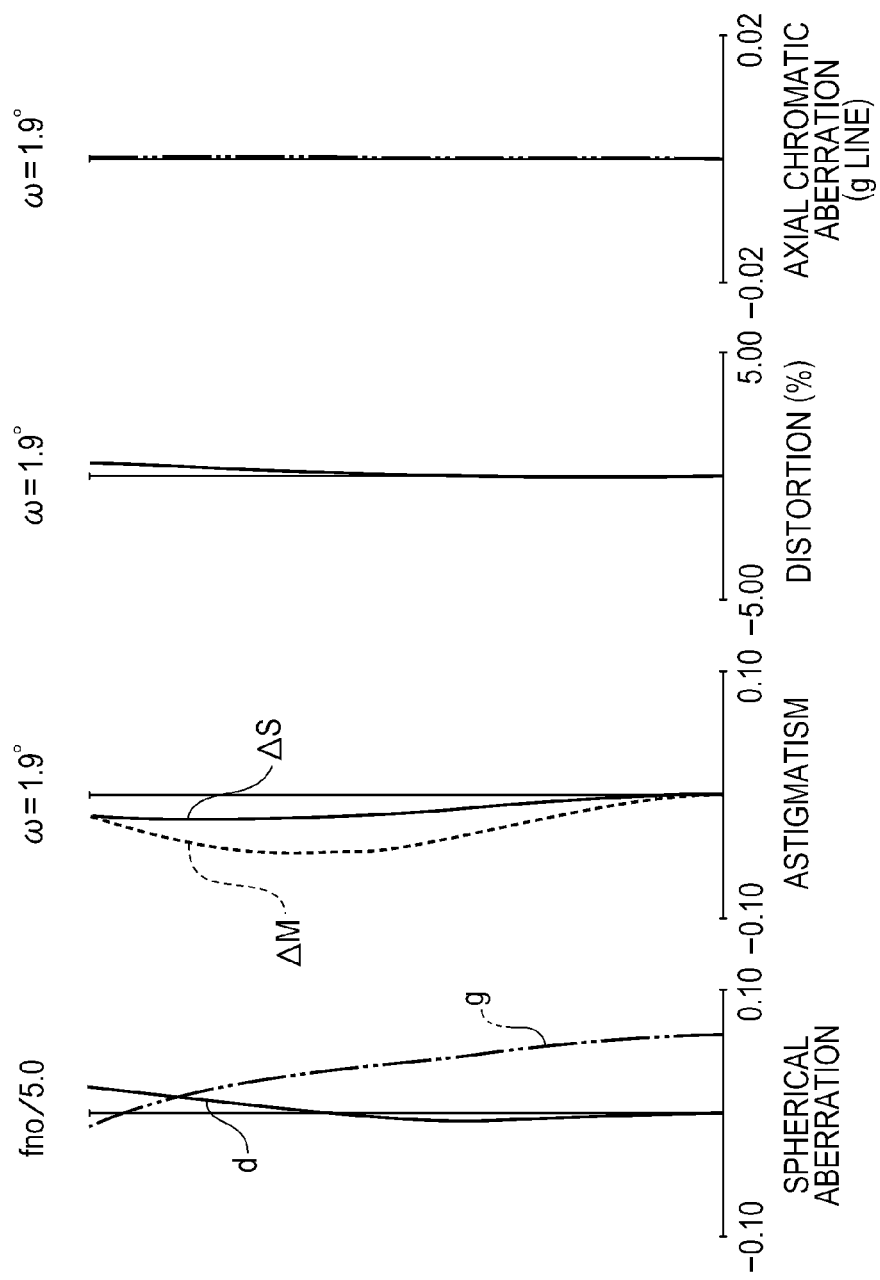
FIG. 4B shows aberrations at the telephoto end according to the second embodiment of the present invention.
Figure 6A:
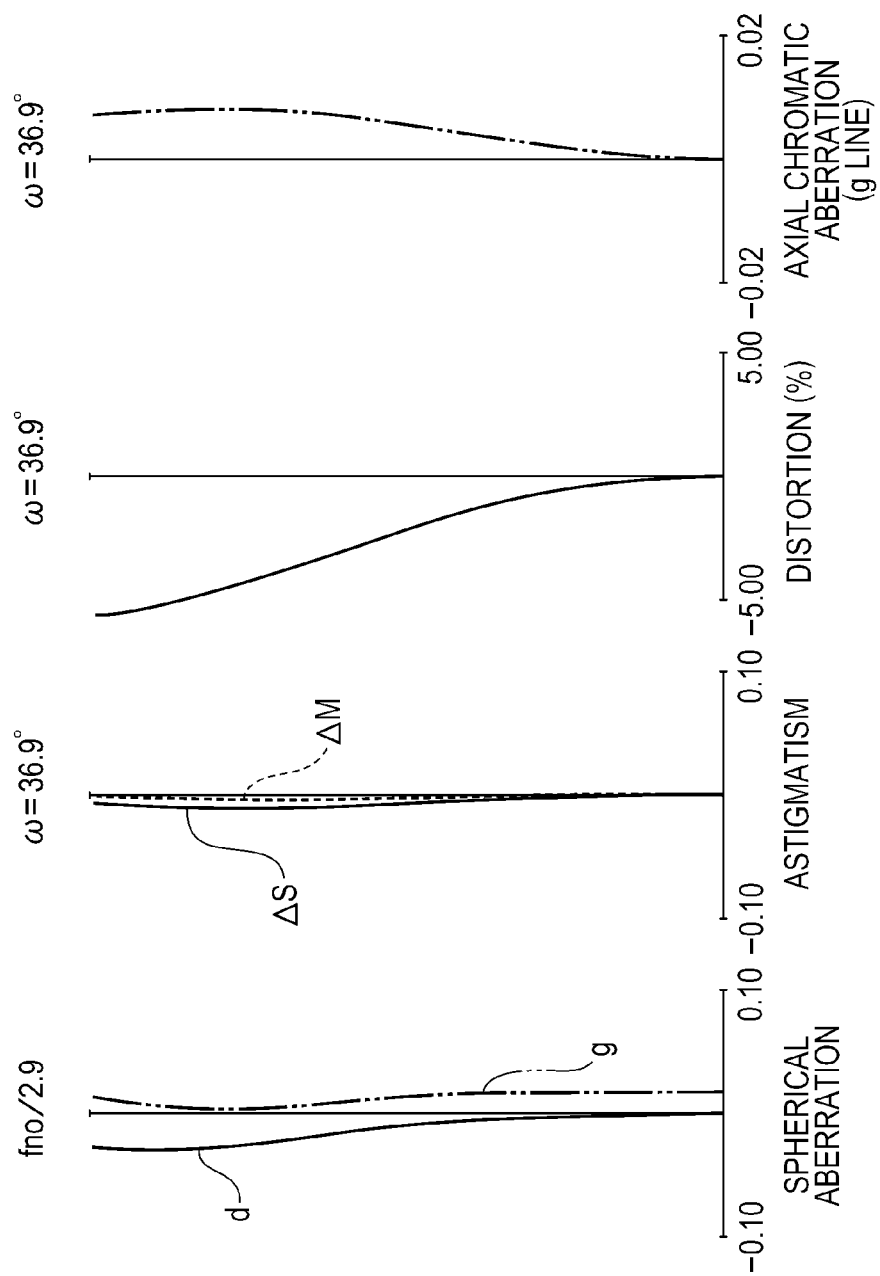
FIG. 6A shows aberrations at the wide angle end according to the third embodiment of the present invention.
Figure 6B:
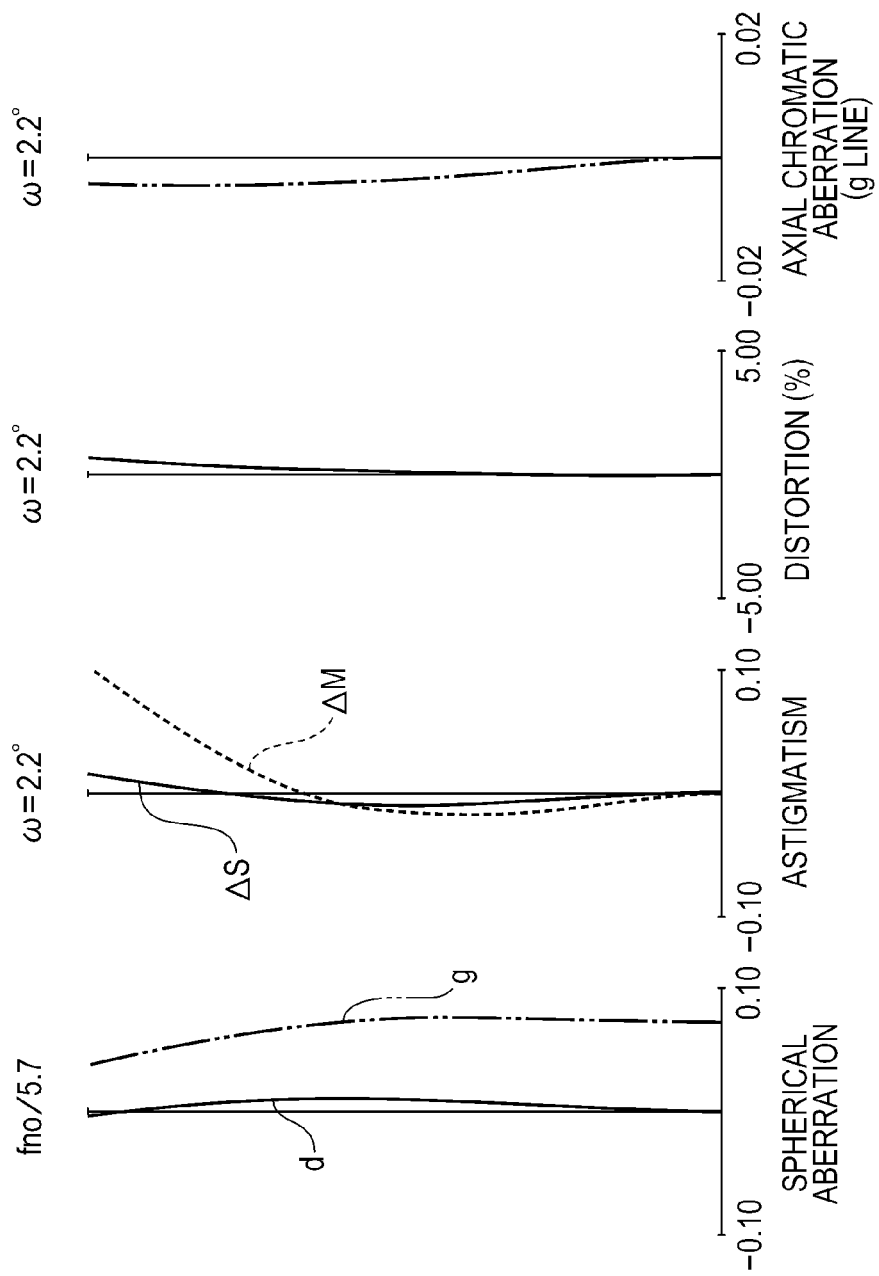
FIG. 6B shows aberrations at the telephoto end according to the third embodiment of the present invention.

FIG. 3 is a sectional view of lenses at the wide angle end of a zoom lens according to a second embodiment of the present invention. FIGS. 4A and 4B show aberrations at the wide angle end and the telephoto end of the zoom lens according to the second embodiment, respectively. FIG. 5 is a sectional view of lenses at the wide angle end of a zoom lens according to a third embodiment of the present invention. FIGS. 6A and 6B show aberrations at the wide angle end and the telephoto end of the zoom lens according to the third embodiment, respectively.

Figure 7:
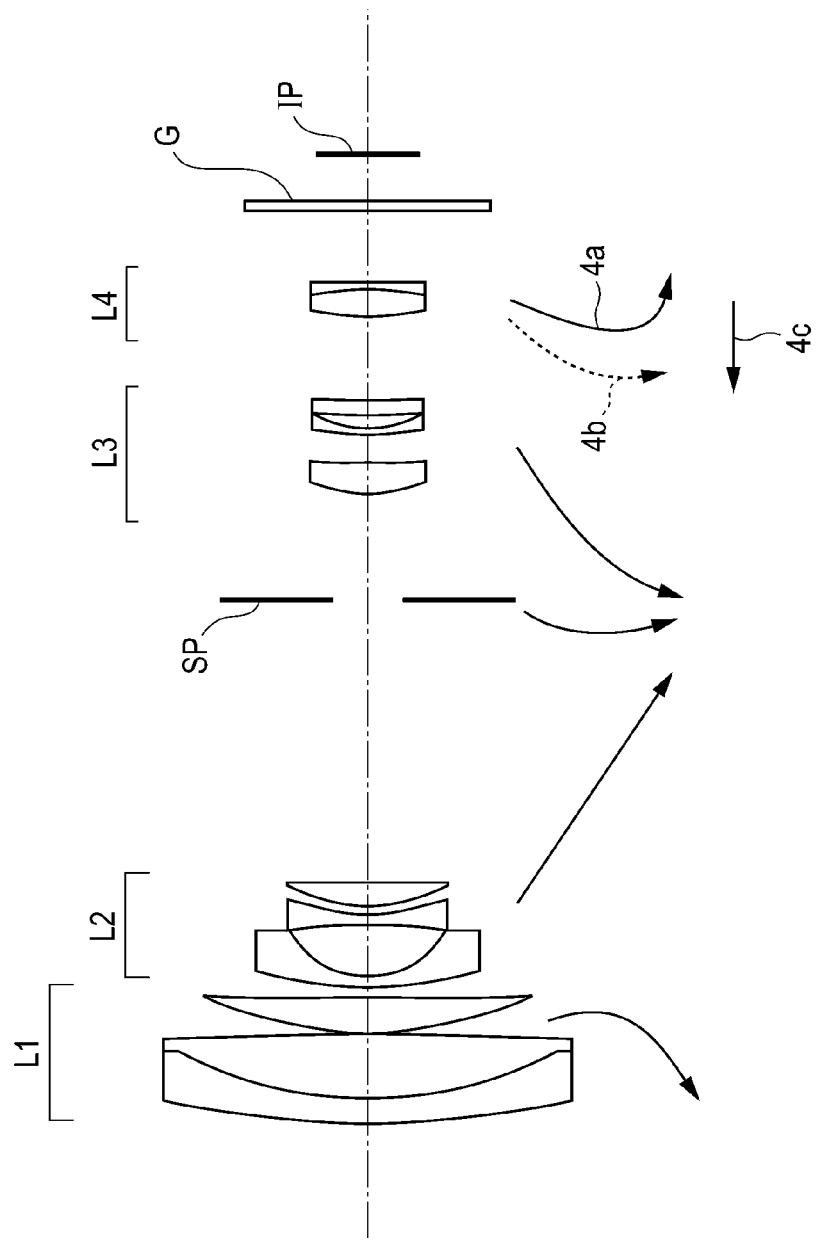
FIG. 7 is a sectional view of lenses at the wide angle end according to a fourth embodiment of the present invention.
Figure 8A:
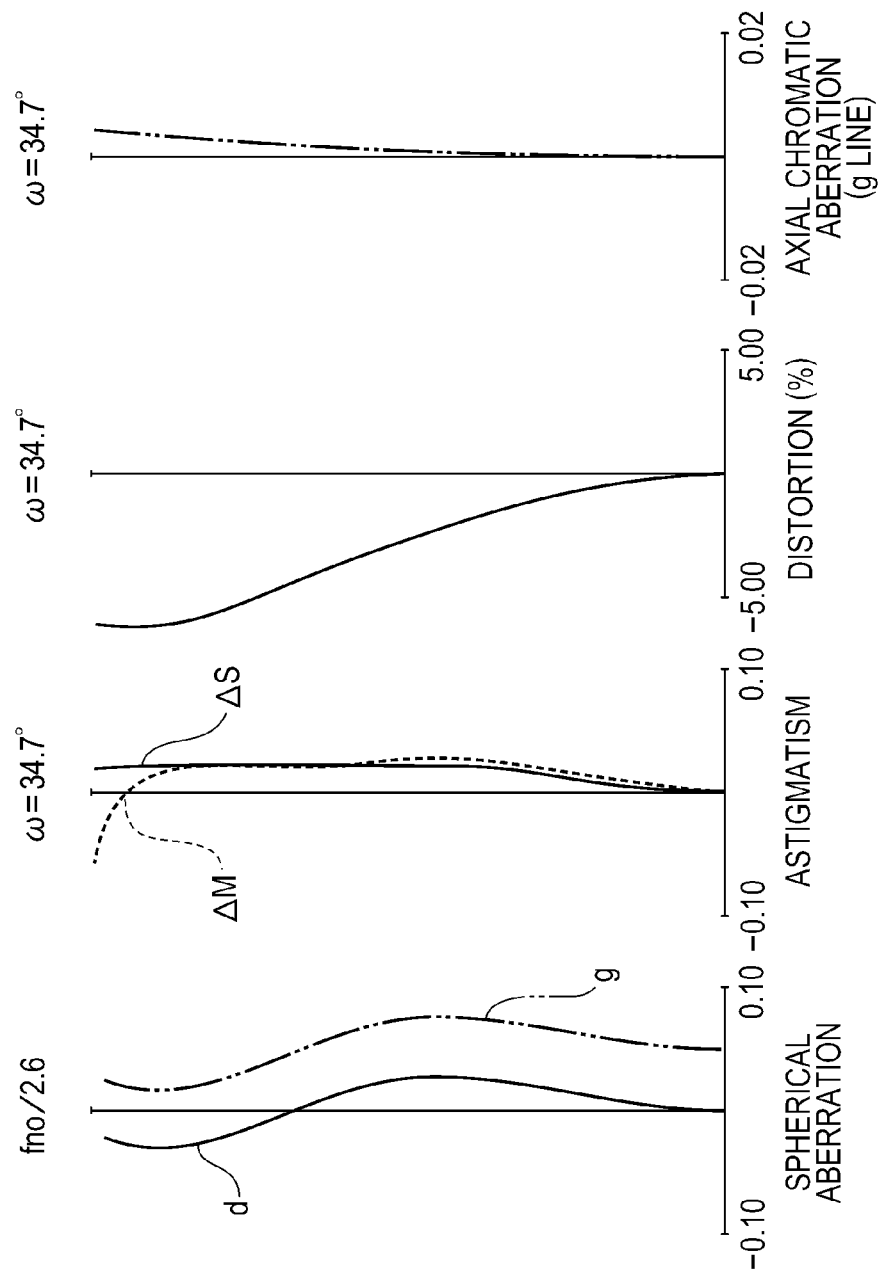
FIG. 8A shows aberrations at the wide angle end according to the fourth embodiment of the present invention.
Figure 8B:
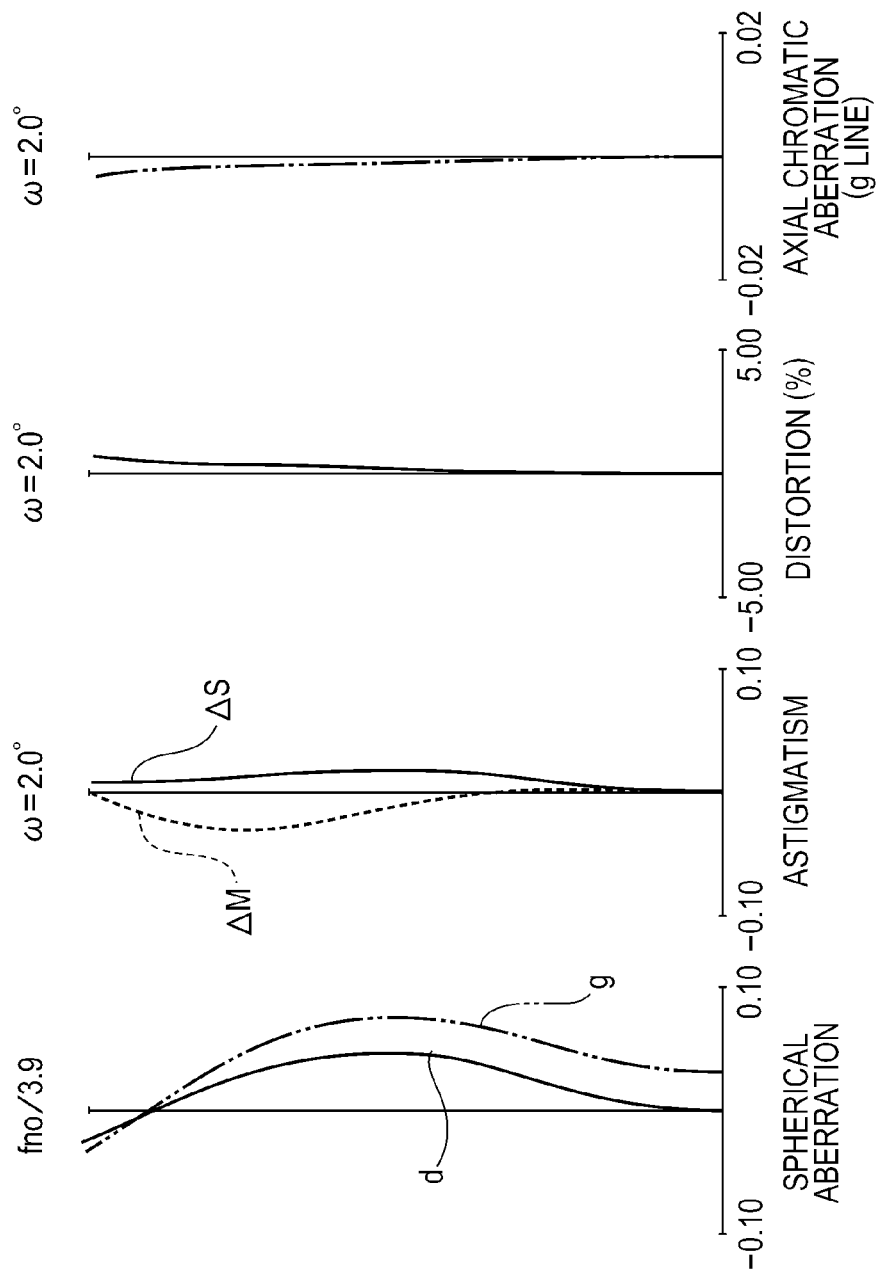
FIG. 8B shows aberrations at the telephoto end according to the fourth embodiment of the present invention.
Figure 9:
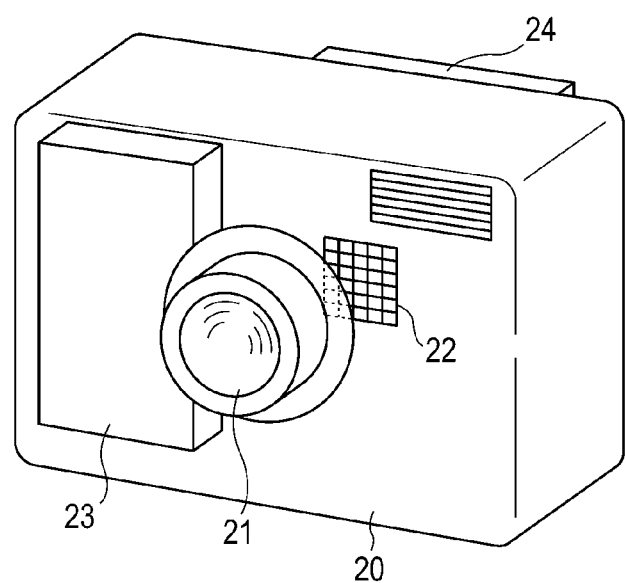
FIG. 9 is a schematic view of an image pickup apparatus according to the present invention.

FIG. 7 is a sectional view of lenses at the wide angle end of a zoom lens according to a fourth embodiment of the present invention. FIGS. 8A and 8B show aberrations at the wide angle end and the telephoto end of the zoom lens according to the fourth embodiment, respectively. FIG. 9 is a schematic view of the main portion of a camera (image pickup apparatus) including the zoom lens according to the present invention. The zoom lens of each embodiment is an image taking optical system used in the image pickup apparatus such as a video camera, a digital camera, or a silver halide film camera.

In the sectional views of the lenses, the left side is the object side (front side), and the right side is the image side (rear side). i represents the order number of the lens unit from the object side, and Li represents an ith lens unit.

In each of the embodiments, L1 represents the first lens unit having a positive refractive power (optical power=reciprocal of focal length), L2 represents the second lens unit having a negative refractive power, L3 represents the third lens unit having a positive refractive power, and L4 represents the fourth lens unit having a positive refractive power.

SP denotes the aperture stop disposed at the object side of the third lens unit L3.

G denotes an optical block corresponding to an optical filter, a faceplate, a crystal low-pass filter, an infrared cut filter, etc.

IP denotes an image plane. When the zoom lens is used as an image taking optical system of a video camera or a digital still camera, the image plane corresponds to an image pickup plane of a solid-state image pickup element (photoelectric conversion element), such as a CCD sensor or a CMOS sensor. When the zoom lens is used as an image taking optical system of a silver halide film camera, the image plane corresponds to a photosensitive plane corresponding to a film plane.

In the aberration figures, d and g represent the d line and the g line, respectively; $\Delta M$ and $\Delta S$ represent a meridional image plane and a sagittal image plane, respectively; and axial chromatic aberration is represented by the g line. $\omega$ represents a half angle of view. fno represents an F number.

In each of the embodiments below, the wide angle end and the telephoto end refer to zooming positions provided when a zoom lens unit (second lens unit L2) is positioned at respective ends of its mechanically movable range along the optical axis.

In each of the embodiments, when zooming from the wide angle end to the telephoto end, each lens unit is moved as indicated by the arrows.

More specifically, in each embodiment, when zooming from the wide angle end to the telephoto end, as shown by the arrow, the first lens unit L1 is moved along a locus convex toward the image side, and is moved so as to be positioned closer to the object at the telephoto end than at the wide angle end. In addition, the second lens unit L2 is moved toward the image side, the third lens unit L3 is moved toward the object side, and the fourth lens unit L4 is moved along a locus convex toward the object side.

By temporarily moving the first lens unit L1 toward the image side when zooming from the wide angle end, an entrance-pupil distance near the wide angle end is reduced, a ray height of off-axis light that is incident upon the first lens unit L1 is reduced, and the diameter of a front lens is reduced.

In zooming, the first lens unit L1 and the third lens unit L3 are moved so that they are positioned closer to the object at the telephoto end than at the wide angle end, so that a high zoom ratio can be obtained while the overall lens length is kept small at the wide angle end.

In particular, in each embodiment, in zooming, the third lens unit L3 is moved toward the object side, so that the zoom ratio is shared by the third lens unit L3 and the fourth lens unit L4. Further, by moving the first lens unit L1 having a positive refractive power toward the object side from a location in a zooming range, the second lens unit L2 is provided with a large magnification variation effect, so that a high zoom ratio is obtained without making the refractive powers of the first lens unit L1 and the second lens unit L2 very large.

A rear-focusing type that performs rear focusing by moving the fourth lens unit L4 along the optical axis is used.

Focusing from an object at infinity to a near object at the telephoto end is carried out by moving out the fourth lens unit L4 forward as shown by an arrow 4c shown in FIG. 1. A solid curve 4a and a dotted curve 4b of the fourth lens unit L4 represent movement loci for correcting an image plane variation resulting from the zooming from the wide angle end to the telephoto end during focusing on the object at infinity and the near object.

In each embodiment, by moving the fourth lens unit L4 for the focusing, quick focusing, such as an automatic focus detection operation, is facilitated.

In each embodiment, by moving part of or the entire third lens unit L3 so as to have a component in a direction perpendicular to the optical axis, taken image blur occurring when the entire optical system is vibrated is corrected.

By this, an image stabilizing operation is performed without providing an additional lens unit for image stabilization or optical member such as a variable vertex angle prism, so that the size of the entire optical system is prevented from becoming large.

The lens unit that is moved perpendicularly to the optical axis for correcting image blur is not limited to the third lens unit L3. However, since, in each embodiment, the aperture stop SP is disposed near the third lens unit L3, the outside diameter of the third lens unit L3 is small, so that, from the viewpoint of driving weight, the third lens unit L3 is desirably used rather than the other lens units.

In each embodiment, when zooming, the aperture stop SP is moved independently of (separately from) the lens units. By this, the pupil-entrance position at a wide-angle-of-view region is situated as close as possible to the object, so that the effective diameter of the front lens is small.

However, depending upon design priority, the aperture stop SP may be moved together with the third lens unit L3 or the aperture stop SP may be fixed with respect to the image plane IP. If the aperture stop SP is moved together with the third lens unit L3, the number of lens units that are divided into lens units that move together, lens units that move, and movable lens units is reduced, thereby tending to simplify the mechanical structure. If the aperture stop SP is fixed, it is not necessary to move an aperture unit. Therefore, in zooming, this is advantageous from the viewpoint of saving electrical power in that driving torque of an actuator that is driven can be set small.

In each embodiment, the focal length of an entire system at the wide angle end is fw, and the focal length of the entire system at the telephoto end is ft. A focal length fm of the entire system at an intermediate zooming position is fm= $(fw * Ft)^{1/2}$.

The amount of movement of the fourth lens unit L4 when zooming from the wide angle end to the intermediate zooming position is Mm, and the amount of movement of the fourth lens unit L4 when zooming from the wide angle end to the telephoto end is Mt.

The focal lengths of the third lens unit L3 and the fourth lens unit L4 are f3 and f4, respectively. In this case, the following conditions are satisfied:

$$1.8 < (|Mm| + |Mt|)/fw < 4.0 \quad (1)$$

$$0.65 < f3/f4 < 1.0 \quad (2)$$

Here, the term "amount of movement" refers to a position change (relative difference) in an optical axis direction of a lens unit at a specified zooming position with respect to a fixed reference position (such as an image formation plane) during zooming (magnification variation). This term does not refer to the amount of movement other than to the specified zooming position.

The signs of the amount of movement are such that a position change from the reference position to the image side is positive, and position change from the reference position to the object side is negative.

In each embodiment, by satisfying the Conditional Expressions (1) and (2), a zoom lens having a wide angle of view and a high zoom ratio is achieved.

A problem when the zoom lens is formed so as to have a wide angle of view and a high zoom ratio (high magnification variation) is variations in coma at a middle area (an intermediate zooming area). This problem may be solved by increasing the number of lenses forming the lens units having high refractive powers or by using aspherical surfaces.

However, increasing the number of lenses forming the lens units increases the size of the entire system. In addition, aspherical surfaces are difficult to form.

The Conditional Expression (1) relates to the ratio between the total amount of movement of the fourth lens unit and the focal length of the entire system at the wide angle end during zooming.

In order to correct outward coma in the middle area, in accordance with the movement of the third lens unit L3 that moves toward the object side during zooming from the wide angle end to the middle area, the fourth lens unit may be moved toward the object side.

In addition, reducing variations in incidence height of off-axis light that is incident upon the fourth lens unit L4 from the wide angle end to the middle area is important in restricting off-axis color flare and coma at the middle area.

If (|Mm|+|Mt|) falls below the lower limit of the Conditional Expression (1), the amount by which the fourth lens unit L4 is moved out toward the object side is not sufficient, thereby causing variations in off-axis aberration.

If (|Mm|+|Mt|) exceeds the upper limit, the amount of movement of the fourth lens unit L4 becomes too large. Therefore, it is difficult to reduce the overall lens length during collapsing of the lens unit and to make the entire system compact. Further, if moving-out directions of the amount of movement Mm and the amount of movement Mt differ from each other, the fourth lens unit L4 is moved by a large amount toward the image side. Therefore, it is difficult to restrict variations in off-axis aberration from the middle area to the telephoto end.

The Conditional Expression (2) expresses the ratio between the focal length of the third lens unit L3 and the focal length of the fourth lens unit L4, and is used for suitably setting the burden of varying magnification on by the third lens unit L3 and the fourth lens unit L4 during zooming.

In each embodiment, a principal magnification variation operation is performed by the second lens unit L2. If the refractive power of the second lens unit L2 is increased due to an increase in the zoom ratio, the effective diameter of the front lens is increased. In particular, the wider the angle of view, the more noticeable this tendency becomes.

The Conditional Expression (2) provides a desirable condition not only when the second lens unit L2 has the burden of varying magnification, but also when the zoom ratio is shared by the third lens unit L3 and the fourth lens unit L4. If f3/f4 falls below the lower limit and the refractive power of the third lens unit L3 becomes too large, an angle of incidence of an off-axis beam emitted from the third lens unit L3 with respect to the fourth lens unit L4 varies considerably during zooming.

Therefore, outward coma tends to occur at, in particular, the intermediate focal length area (middle area). In contrast, if f3/f4 exceeds the upper limit and the refractive power of the fourth lens unit L4 becomes too large, in order to restrict variations in coma during focusing, it becomes necessary to increase the number of lenses making up the fourth lens unit L4. As a result, the weight of the lenses that are driven during the focusing is increased or the size of the entire lens unit is increased, which are not desirable.

It is further desirable that the numerical ranges of the Conditional Expressions (1) and (2) be set as follows:

$$1.8 < (|Mm| + |Mt|)/fw < 4.0 \quad (1a)$$

$$0.65 < f3/f4 < 1.0 \quad (2a)$$

According to these expressions, it becomes easy to achieve a wide angle of view and a high zoom ratio, and to restrict variations in aberrations at the middle area.

Accordingly, according to each embodiment, it is possible to obtain a zoom lens having a higher zoom ratio (higher magnification) and having good optical performance over the entire zooming range from the wide angle end to the telephoto end.

In each embodiment, it is further desirable that at least one of the following various conditions be satisfied.

The amount of movement of the second lens unit L2 during zooming from the wide angle end to the telephoto end is M2.

The amount of movement of the third lens unit L3 during zooming from the wide angle end to the telephoto end is M3.

Here, at least one of the following conditions may be satisfied:

$$2.0<|Mm/Mt|<4.0 \qquad (3)$$

$$0.01<|M3|/ft<0.20 \qquad (4)$$

$$2.0<|M2|/fw<6.0 \qquad (5)$$

According to these conditions, advantages that are in accordance therewith can be obtained.

The Conditional Expression (3) expresses the ratio between the amount of movement of the fourth lens unit L4 during zooming from the wide angle end to the middle area and the amount of movement thereof during zooming from the wide angle end to the telephoto end.

An increase in the zoom ratio (magnification) causes the total amount of movement of the fourth lens unit L4 during zooming to the telephoto end to increase.

If there is a proper balance between a move-out amount to the object side and a move-in amount to the image side with respect to a position along an optical axis of the fourth lens unit L4 at the wide angle end serving as a reference at this time, a retracted length can be further reduced.

In each embodiment, the fourth lens unit L4 is positioned closer to the object at a zooming position in the middle area, represented by the focal length fm, than at the wide angle end. In addition, the fourth lens unit L4 is positioned closer to the image at the telephoto end than at the wide angle end.

However, if the Conditional Expression (3) is satisfied, the movements do no necessarily have to be limited thereto.

If |Mm/Mt| falls below the lower limit of the Conditional Expression (3), and the move-in amount of the fourth lens unit L4 to the image side is increased, the fourth lens unit L4 and the glass block G tend to interfere with each other at the telephoto end.

At the telephoto end, the distance between the third lens unit L3 and the fourth lens unit L4 that have been moved out to the object side is not used. Therefore, this is not effective from the viewpoint of retracted length.

In contrast, if |Mm/Mt| exceeds the upper limit of the Conditional Expression (3), the move-out amount of the fourth lens unit L4 towards the object side is increased. Therefore, at the middle area, the fourth lens unit L4 tends to mechanically interfere with the third lens unit L3. At the same time, the move-out amount at the telephoto end is reduced, as a result of which, if a tele-macro image taking operation (macro image taking operation at the telephoto end) is performed, a sufficient magnification is difficult to obtain.

The Conditional Expression (4) expresses the ratio between the amount of movement of the third lens unit L3 and the focal length of the entire system at the telephoto end during zooming from the wide angle end to the telephoto end. If |M3|/ft falls below the lower limit of the Conditional Expression (4), the zooming positions at the wide angle end and the telephoto end of the third lens unit L3 become substantially the same along the optical axis. Therefore, the third lens unit L3 and the fourth lens unit 14 tend to mechanically interfere with each other in the middle area at which the fourth lens unit L4 at the image side is positioned closest to the object.

In order to avoid this, it is necessary to increase the overall lens length. As a result, it is difficult to make the entire system compact.

If |M3|/ft exceeds the upper limit of the Conditional Expression (4), the amount of movement of the third lens unit L3 during zooming is increased. Therefore, it is difficult to reduce the overall retracted length.

The Conditional Expression (5) expresses the amount of movement of the second lens unit L2 during zooming. The second lens unit L2, which is a principal zoom lens unit, needs to be separated by a large distance from the first lens unit L1 at the telephoto end due to an increase in the zoom ratio (increase in magnification).

If |M2|/fw falls below the lower limit of the Conditional Expression (5) and the amount of movement of the second lens unit L2 is reduced, it becomes necessary to move out the first lens unit L1 by a large amount to the object side at the telephoto end. When this is done, if a collapsible lens barrel is used, the first lens unit L1 having a large outside diameter and being heavy is considerably moved. This increases the size of the entire lens system, the size of an actuator for driving it, and power consumption, which are not desirable.

In the lens structure of each embodiment, the distance between the second lens unit L2 and the third lens unit L3 becomes a maximum at the wide angle end and becomes a minimum at the telephoto end. In this zoom structure, if |M2|/fw exceeds the upper limit of the Condition Expression (5) and the amount of movement of the second lens unit L2 becomes large, the distance between the third lens unit L3 and the aperture stop SP, disposed at the object side of the third lens unit L3, changes considerably when magnification is varied. Therefore, variations in incidence height of off-axis light passing through the second lens unit L2 becomes large.

The second lens unit L2, which is the principal zoom lens unit, is such that its refractive power is greater than those of the other lens units, and such that the radius of curvature of each lens surface is small. Therefore, variations in aberrations caused by the variations in the incidence height of the off-axis light are increased. In order to avoid this, it is necessary to increase the number of lenses making up the lens unit or to increase the number of aspherical surfaces, which are not desirable.

In each embodiment, in order to achieve a higher zoom ratio while reducing variations in aberrations during zooming and corrections of the aberrations, it is desirable to set the numerical ranges of the Conditional Expressions (3) and (4) as follows:

$$2.0<|Mm/Mt|<3.0 \qquad (3a)$$

$$0.05<|M3|/ft<0.20 \qquad (4a)$$

$$2.0<|M2|/fw<5.0 \qquad (5a)$$

Accordingly, according to each embodiment, by suitably setting, for example, the refractive power of each lens unit and the amount of movement of each lens unit in performing zooming, it is possible to obtain a zoom lens having high optical performance while reducing the size of the entire lens system even if the angle of view is wide and the zoom ratio is high.

In particular, it is possible to obtain a zoom lens having good optical performance over the entire zooming range from the wide angle end to the telephoto end.

Next, the lens structure of each lens unit will be described.

Since the effective lens diameter of the first lens unit L1 becomes large, in order to make the entire system smaller and lighter, it is desirable to reduce the number of lenses.

In each embodiment, the first lens unit L1 includes three lenses as a whole, that is, in order from the object side to the image side, a cemented lens, in which one negative lens (a lens having a negative refractive power) and one positive lens (a lens having a positive refractive power) are cemented to each other, and a positive lens. By this, chromatic aberration and spherical aberration occurring due to a higher magnification (a higher zoom ratio) are reduced.

In each of the first to third embodiments, the second lens unit L2 includes four independent lenses, that is, in order from the object side to the image side, two negative lenses whose object-side surfaces have convex meniscus forms, a negative lens whose both surfaces have concave forms, and a positive lens whose object-side surface has a convex form.

By this, variations in aberrations during zooming are reduced, and, in particular, distortion at the wide angle end and spherical aberration at the telephoto end are properly corrected.

In the fourth embodiment, the second lens unit L2 includes three independent lenses, that is, in order from the object side to the image side, a negative lens whose object-side surface has a convex meniscus form, a negative lens whose both lens surfaces have concave forms, and one positive lens whose object-side surface has a convex form.

In the fourth embodiment, compared to the other embodiments, by using an aspherical surface in the negative lens closest to the object, the second lens unit L2 is formed using few lenses and the size and weight of the entire system are easily reduced.

In each embodiment, the third lens unit L3 includes as a whole three or more lenses including two positive lenses and a negative lens whose image-side surface has a concave form. By reducing the principal-point distance between the second lens unit L2 and the third lens unit L3, the lens lengths of the third lens unit L3 onwards are reduced.

The third lens unit L3 has one or more aspherical surfaces. By this, variations in aberrations caused by zooming are properly corrected.

In addition, in the first to third embodiments, the third lens unit L3 includes four lenses including a cemented lens in which negative and positive lenses are cemented to each other. By this, variations in chromatic aberrations during zooming are restricted and aberrations caused by decentering when correcting image blur by decentering the third lens unit L3 from the optical axis is restricted.

In each embodiment, by forming the fourth lens unit L4 so as to include a cemented lens, in which a negative lens and a positive lens whose object-side surface has a convex form are cemented to each other, variations in chromatic aberration during focusing are restricted while reducing weight.

The zoom lens according to each embodiment having the above-described structure is one in which the entire system is compact while, at the wide angle end, an angle of view (image-taking angle of view) is large and a high magnification variation ratio (high zoom ratio) is achieved. Further, advantages corresponding to each of the conditional expressions are obtained by satisfying the aforementioned conditional expressions.

Next, Numerical Examples 1 to 4 corresponding to the first to fourth embodiments, respectively, according to the present invention will be shown. In each numerical example, i denotes the order number of an optical surface from the object side, ri denotes a curvature radius of an ith optical surface (ith surface), di denotes a distance between the ith surface and the (i+1)th surface, and ni and [nu]i denote a refractive index and an Abbe number of a material of an ith optical member with reference to the d-line, respectively.

If k represents eccentricity; B, C, D, and E represent aspherical surface coefficients, and a displacement in an optical axis direction at the position of a height h from an optical axis with reference to a vertex of a surface is x, the form of an aspherical surface is determined by:

$$x=(h^2/R)/[1+[1-(1+k)(h/R)^2]^{1/2}]+Bh^4+Ch^6+Dh^8+Eh^{10}+A'h^3+B'h^5+C'h^7$$

Here, R represents a radius of curvature. For example, "$E^{-z}$" means "$10^{-z}$." f represents a focal length, Fno represents an F number, and ω represents a half angle of view.

In the numerical examples, the last two surfaces correspond to surfaces of the optical block such as a filter or a faceplate.

Table 17 shows correspondences with the aforementioned conditional expressions in each of the numerical examples.

Numerical Example 1

TABLE 1

| i | ri | di | ni | [nu]i |
|---|-----|-----|-----|------|
| 1 | 91.458 | 2.00 | 1.80610 | 33.3 |
| 2 | 34.222 | 6.20 | 1.49700 | 81.5 |
| 3 | −261.230 | 0.20 | 1. | |
| 4 | 33.178 | 3.60 | 1.69680 | 55.5 |
| 5 | 138.908 | VARIABLE | 1. | |
| 6 | 60.396 | 1.00 | 1.88300 | 40.8 |
| 7 | 11.399 | 1.90 | 1. | |
| 8 | 26.065 | 0.85 | 1.83481 | 42.7 |
| 9 | 9.008 | 3.30 | 1. | |
| 10 | −67.711 | 0.80 | 1.83400 | 37.2 |
| 11 | 30.418 | 0.20 | 1. | |
| 12 | 15.874 | 2.25 | 1.92286 | 18.9 |
| 13 | 163.511 | VARIABLE | 1. | |
| 14 | (STOP) | VARIABLE | 1. | |
| 15* | 11.553 | 3.00 | 1.69350 | 53.2 |
| 16 | 110.250 | 3.00 | 1. | |
| 17 | 38.290 | 0.90 | 1.65844 | 50.9 |
| 18 | 12.267 | 0.50 | 1. | |
| 19 | 22.688 | 0.70 | 2.00069 | 25.5 |
| 20 | 8.329 | 2.50 | 1.72000 | 50.2 |
| 21 | −45.246 | VARIABLE | 1. | |
| 22 | 24.839 | 2.50 | 1.77250 | 49.6 |
| 23 | −20.522 | 0.60 | 1.69895 | 30.1 |
| 24 | 520.416 | VARIABLE | 1. | |
| 25 | INFINITY | 0.950 | 1.51633 | 64.1 |
| 26 | INFINITY | | | |

TABLE 2

ASPHERICAL SURFACE

| (15TH SURFACE) | k = 6.49556E−1 |
| | B = −1.04689E−4   C = −1.11852E−6   D = 1.71101E−8   E = −5.84379E−9 |

TABLE 3

VARIOUS DATA
ZOOM RATIO 19.21

| | WIDE ANGLE | INTERMEDIATE | TELEPHOTO |
|---|---|---|---|
| FOCAL LENGTH | 5.15 | 22.61 | 98.95 |
| F NUMBER | 2.87 | 3.79 | 5.43 |
| ANGLE OF VIEW | 36.9 | 9.7 | 2.2 |
| IMAGE HEIGHT | 3.87 | 3.87 | 3.87 |
| OVERALL LENS LENGTH | 87.20 | 93.13 | 109.70 |
| BF | 10.96 | 19.83 | 7.97 |
| d5 | 0.90 | 20.33 | 38.12 |
| d13 | 21.78 | 2.12 | 1.85 |
| d14 | 11.57 | 5.84 | 1.40 |
| d21 | 6.00 | 9.02 | 24.39 |
| d24 | 7.00 | 15.87 | 4.01 |

TABLE 4

ZOOM LENS UNIT DATA

| UNIT | STARTING SURFACE | FOCAL LENGTH |
|---|---|---|
| 1 | 1 | 56.04 |
| 2 | 6 | −9.27 |
| 3 | 15 | 21.23 |
| 4 | 22 | 30.02 |

TABLE 7

VARIOUS DATA
ZOOM RATIO 21.10

| | WIDE ANGLE | INTERMEDIATE | TELEPHOTO |
|---|---|---|---|
| FOCAL LENGTH | 5.45 | 25.05 | 115.00 |
| F NUMBER | 2.87 | 4.09 | 4.98 |
| ANGLE OF VIEW | 35.2 | 8.74 | 1.92 |
| IMAGE HEIGHT | 3.85 | 3.85 | 3.85 |
| OVERALL LENS LENGTH | 88.79 | 102.23 | 123.79 |
| BF | 10.97 | 19.65 | 7.38 |
| d5 | 0.90 | 28.92 | 49.94 |
| d13 | 29.11 | 8.52 | 1.80 |
| d14 | 5.56 | 0.14 | 1.90 |
| d21 | 6.50 | 8.76 | 28.02 |
| d24 | 6.00 | 14.68 | 2.41 |

TABLE 8

ZOOM LENS UNIT DATA

| UNIT | STARTING SURFACE | FOCAL LENGTH |
|---|---|---|
| 1 | 1 | 71.29 |
| 2 | 6 | −10.21 |
| 3 | 15 | 21.66 |
| 4 | 22 | 32.02 |

Numerical Example 2

TABLE 5

| i | ri | di | ni | [nu]i |
|---|---|---|---|---|
| 1 | 79.725 | 1.90 | 1.80610 | 33.3 |
| 2 | 39.705 | 5.20 | 1.49700 | 81.5 |
| 3 | −3382.046 | 0.20 | 1. | |
| 4 | 40.337 | 3.90 | 1.60311 | 60.6 |
| 5 | 177.679 | VARIABLE | 1. | |
| 6 | 45.925 | 1.00 | 1.88300 | 40.8 |
| 7 | 11.246 | 2.10 | 1. | |
| 8 | 27.312 | 0.85 | 1.80610 | 33.3 |
| 9 | 9.478 | 3.80 | 1. | |
| 10 | −25.153 | 0.80 | 1.83400 | 37.2 |
| 11 | 92.127 | 0.20 | 1. | |
| 12 | 22.273 | 2.25 | 1.92286 | 18.9 |
| 13 | −82.423 | VARIABLE | 1. | |
| 14 | (STOP) | VARIABLE | 1. | |
| 15* | 11.635 | 3.00 | 1.69350 | 53.2 |
| 16 | 195.164 | 3.00 | 1. | |
| 17 | 30.920 | 0.90 | 1.64769 | 33.8 |
| 18 | 11.175 | 0.50 | 1. | |
| 19 | 20.767 | 0.70 | 2.00330 | 28.3 |
| 20 | 8.036 | 2.15 | 1.72000 | 50.2 |
| 21 | −89.863 | VARIABLE | 1. | |
| 22 | 26.489 | 2.70 | 1.77250 | 49.6 |
| 23 | −19.597 | 0.60 | 1.80610 | 33.3 |
| 24 | −206.157 | VARIABLE | 1. | |
| 25 | INFINITY | 0.80 | 1.51633 | 64.1 |
| 26 | INFINITY | | | |

TABLE 6

ASPHERICAL SURFACE (15TH SURFACE)  k = 6.49556E−1
B = −1.04689E−4  C = −1.11852E−6  D = 1.71101E−8  E = −5.84379E−10

Numerical Example 3

TABLE 9

| i | ri | di | ni | [nu]i |
|---|---|---|---|---|
| 1 | 84.274 | 2.00 | 1.80610 | 33.3 |
| 2 | 32.475 | 6.20 | 1.49700 | 81.5 |
| 3 | −431.509 | 0.20 | 1. | |
| 4 | 33.415 | 3.60 | 1.69680 | 55.5 |
| 5 | 180.027 | VARIABLE | 1. | |
| 6 | 64.172 | 1.00 | 1.88300 | 40.8 |
| 7 | 11.733 | 1.90 | 1. | |
| 8 | 29.308 | 0.85 | 1.83481 | 42.7 |
| 9 | 9.447 | 3.30 | 1. | |
| 10 | −36.240 | 0.80 | 1.83400 | 37.2 |
| 11 | 57.884 | 0.20 | 1. | |
| 12 | 19.186 | 2.25 | 1.92286 | 18.9 |
| 13 | −416.054 | VARIABLE | 1. | |
| 14 | (STOP) | VARIABLE | 1. | |
| 15* | 12.148 | 3.00 | 1.69350 | 53.2 |
| 16 | 847.526 | 3.00 | 1. | |
| 17 | 63.798 | 0.90 | 1.64769 | 33.8 |
| 18 | 14.183 | 0.50 | 1. | |
| 19 | 27.624 | 0.70 | 2.00330 | 28.3 |
| 20 | 8.242 | 2.40 | 1.74400 | 44.8 |
| 21 | −47.263 | VARIABLE | 1. | |
| 22 | 20.094 | 2.70 | 1.77250 | 49.6 |
| 23 | −15.105 | 0.60 | 1.80610 | 33.3 |
| 24 | 229.772 | VARIABLE | 1. | |
| 25 | INFINITY | 0.95 | 1.51633 | 64.1 |
| 26 | INFINITY | | | |

TABLE 10

ASPHERICAL SURFACE (15TH SURFACE) k = 1.62671
B = −1.65451E−4  C = −1.30791E−6  D = −2.64512E−8  E = −5.84379E−10

TABLE 11

VARIOUS DATA
ZOOM RATIO 19.22

|  | WIDE ANGLE | INTERMEDIATE | TELEPHOTO |
|---|---|---|---|
| FOCAL LENGTH | 5.15 | 22.59 | 98.97 |
| F NUMBER | 2.87 | 4.41 | 5.66 |
| ANGLE OF VIEW | 36.9 | 9.71 | 2.24 |
| IMAGE HEIGHT | 3.87 | 3.87 | 3.87 |
| OVERALL LENS LENGTH | 89.44 | 97.87 | 110.69 |
| BF | 10.84 | 17.36 | 7.85 |
| d5 | 0.90 | 20.18 | 36.34 |
| d13 | 24.19 | 7.83 | 1.70 |
| d14 | 11.40 | 2.43 | 1.20 |

TABLE 11-continued

VARIOUS DATA
ZOOM RATIO 19.22

|  | WIDE ANGLE | INTERMEDIATE | TELEPHOTO |
|---|---|---|---|
| d21 | 6.00 | 14.00 | 27.51 |
| d24 | 7.00 | 13.52 | 4.01 |

TABLE 12

ZOOM LENS UNIT DATA

| UNIT | STARTING SURFACE | FOCAL LENGTH |
|---|---|---|
| 1 | 1 | 54.73 |
| 2 | 6 | −9.62 |
| 3 | 15 | 21.95 |
| 4 | 22 | 30.19 |

Numerical Example 4

TABLE 13

| i | ri | di | ni | [nu]i |
|---|---|---|---|---|
| 1 | 107.907 | 1.90 | 1.80610 | 33.3 |
| 2 | 29.867 | 5.50 | 1.49700 | 81.5 |
| 3 | −318.034 | 0.20 | 1. | |
| 4 | 33.475 | 3.20 | 1.77250 | 49.6 |
| 5 | 275.840 | VARIABLE | 1. | |
| 6 | 35.669 | 1.00 | 1.80610 | 40.7 |
| 7* | 8.123 | 4.79 | 1. | |
| 8 | −24.419 | 0.80 | 1.69680 | 55.5 |
| 9 | 15.204 | 0.70 | 1. | |

TABLE 13-continued

| i | ri | di | ni | [nu]i |
|---|---|---|---|---|
| 10 | 14.303 | 2.00 | 1.92286 | 18.9 |
| 11 | 47.173 | VARIABLE | 1. | |
| 12 | (STOP) | VARIABLE | 1. | |
| 13* | 9.520 | 2.70 | 1.58313 | 59.4 |
| 14 | −84.385 | 2.30 | 1. | |
| 15 | 16.410 | 0.70 | 1.84666 | 23.9 |
| 16 | 8.001 | 1.00 | 1. | |
| 17 | 18.086 | 1.60 | 1.49700 | 81.5 |
| 18 | 89.455 | VARIABLE | 1. | |
| 19 | 22.179 | 2.50 | 1.69680 | 55.5 |
| 20 | −24.645 | 0.60 | 1.84666 | 23.9 |
| 21 | −60.729 | VARIABLE | 1. | |
| 22 | INFINITY | 1.31 | 1.49831 | 65.1 |
| 23 | INFINITY |  |  | |

TABLE 14

ASPHERICAL SURFACE (7TH SURFACE)  k = 1.77319E−1  B = −2.03881E−5  C = −5.82581E−7
(13TH SURFACE) k = −4.73317E−1  B = 1.12159E−4  C = 3.43802E−5  D = 4.49684E−7
               E = −1.35163E−9  A' = −1.51965E−4  B' = −1.01902E−4  C' = −6.03458E−6

TABLE 15

VARIOUS DATA
ZOOM RATIO 19.42

|  | WIDE ANGLE | INTERMEDIATE | TELEPHOTO |
|---|---|---|---|
| FOCAL LENGTH | 5.15 | 22.72 | 99.99 |
| F NUMBER | 2.63 | 3.15 | 3.92 |
| ANGLE OF VIEW | 34.7 | 8.92 | 2.04 |
| IMAGE HEIGHT | 3.56 | 3.56 | 3.56 |
| OVERALL LENS LENGTH | 84.55 | 88.78 | 97.61 |
| BF | 10.72 | 18.09 | 7.47 |
| d5 | 0.80 | 22.72 | 36.73 |
| d11 | 25.18 | 6.40 | 2.00 |
| d12 | 9.20 | 4.81 | 2.00 |
| d18 | 7.16 | 5.61 | 17.91 |
| d21 | 6.00 | 13.37 | 2.76 |

TABLE 16

ZOOM LENS UNIT DATA

| UNIT | STARTING SURFACE | FOCAL LENGTH |
|---|---|---|
| 1 | 1 | 52.06 |
| 2 | 6 | −9.00 |
| 3 | 13 | 21.51 |
| 4 | 19 | 25.77 |

TABLE 17

| CONDITIONAL EXPRESSION | FIRST EMBODIMENT | SECOND EMBODIMENT | THIRD EMBODIMENT | FOURTH EMBODIMENT |
|---|---|---|---|---|
| (1) | 2.30 | 2.25 | 1.85 | 2.06 |
| (2) | 0.71 | 0.68 | 0.73 | 0.83 |
| (3) | 2.96 | 2.42 | 2.18 | 2.27 |
| (4) | 0.16 | 0.16 | 0.19 | 0.08 |
| (5) | 2.86 | 2.39 | 2.75 | 4.40 |

Next, an embodiment of a digital still camera, in which a zoom lens, such as that according to any one of the aforementioned embodiments, is used as an image taking optical system, will be described with reference to FIG. 9.

In FIG. 9, reference numeral 20 denotes a camera body, and reference numeral 21 denotes an image taking optical system formed by any one of the zoom lenses described in the first to fourth embodiments.

Reference numeral 22 denotes a solid-state image pickup element (photoelectric conversion element), such as a CCD sensor or a CMOS sensor, that receives an object image formed by the image taking optical system 21. Reference numeral 23 denotes a memory that records information corresponding to the object image subjected to photoelectric conversion by the solid-state image pickup element 22. Reference numeral 24 denotes a finder formed by, for example, a liquid crystal display panel, and used for observing the object image formed on the solid-state image pickup element 22.

By applying the zoom lens according to the present invention to the image pickup apparatus such as the digital still camera in this way, it is possible to realize an image pickup apparatus that is small and that has high optical performance.

While the present invention has been described with reference to exemplary embodiments, it is to be understood that the invention is not limited to the disclosed exemplary embodiments. Various modifications and changes can be made within the gist of the present invention.

This application claims the benefit of Japanese Patent Application No. 2009-001446, filed Jan. 7, 2009, which is hereby incorporated by reference herein in its entirety.

The invention claimed is:

1. A zoom lens comprising:
a first lens unit having a positive refractive power;
a second lens unit having a negative refractive power;
a third lens unit having a positive refractive power; and
a fourth lens unit having a positive refractive power,
wherein the first lens unit, the second lens unit, the third lens unit, and the fourth lens unit are disposed in that order from an object side to an image side,
wherein each lens unit moves to perform zooming, and
wherein the following conditions are satisfied:

$1.8 \leq (|Mm|+|Mt|)/fw < 4.0$ $0.65 < f3/f4 < 1.0$ $2.0 < |M2|/fw < 6.0$ where a focal length of the zoom lens at a wide angle end is fw, a focal length of the zoom lens at a telephoto end is ft, a focal length of the zoom lens at an intermediate zooming position is $fm = (fw*ft)^{1/2}$, an amount of movement of the fourth lens unit with respect to the image plane when zooming from the wide angle end to the intermediate zooming position is Mm, an amount of movement of the fourth lens unit with respect to the image plane when zooming from the wide angle end to the telephoto end is Mt, an amount of movement of the second lens unit with respect to the image plane in zooming from the wide angle end to the telephoto end is M2, and focal lengths of the third lens unit and the fourth lens unit are f3 and f4, respectively.

2. The zoom lens according to claim 1, wherein the fourth lens unit moves along a locus convex toward the object side when zooming from the wide angle end to the telephoto end.

3. The zoom lens according to claim 1, wherein the following condition is satisfied:

$0.01 < |M3|/ft < 0.20$ where an amount of movement of the third lens unit with respect to the image plane in zooming from the wide angle end to the telephoto end is M3.

4. The zoom lens according to claim 1, wherein, when zooming from the wide angle end to the telephoto end, the first lens unit moves along a locus convex toward the image side, and is positioned closer to the object side at the telephoto end than at the wide angle end.

5. The zoom lens according to claim 1, further comprising an aperture stop that is disposed at the object side of the third lens unit, and that moves independently of the lens units when zooming.

6. The zoom lens according to claim 1, wherein part of or the entire third lens unit is moved so as to have a component in a direction perpendicular to an optical axis, to correct taken image blur occurring when the zoom lens is vibrated.

7. The zoom lens according to claim 1, wherein an image is formed at a solid-state image pickup element.

8. The zoom lens according to claim 1, wherein a ratio of the amount of movement Mm to the amount of movement Mt of the fourth lens unit satisfies the following condition:

$2.0 < |Mm/Mt| < 4.0$.

9. An image pickup apparatus comprising:
a zoom lens; and
a solid-state image pickup element that receives an image formed by the zoom lens,
wherein the zoom lens comprises, in order from an object side to an image side:
a first lens unit having a positive refractive power;
a second lens unit having a negative refractive power;
a third lens unit having a positive refractive power; and
a fourth lens unit having a positive refractive power,
wherein the first lens unit, the second lens unit, the third lens unit, and the fourth lens unit are disposed in that order from an object side to an image side,
wherein each lens unit moves to perform zooming, and
wherein the following conditions are satisfied:

$1.8 \leq (|Mm|+|Mt|)/fw < 4.0$ $0.65 < f3/f4 < 1.0$ $2.0 < |M2|/fw < 6.0$ where a focal length of the zoom lens at a wide angle end is fw, a focal length of the zoom lens at a telephoto end is ft, a focal length of the zoom lens at an intermediate zooming position is $fm = (fw*ft)^{1/2}$, an amount of movement of the fourth lens unit with respect to an image plane when zooming from the wide angle end to the intermediate zooming position is Mm, an amount of movement of the fourth lens unit with respect to the image plane when zooming from the wide angle end to the telephoto end is Mt, an amount of movement of the second lens unit with respect to the image plane in zooming from the wide angle end to the telephoto end is M2, and focal lengths of the third lens unit and the fourth lens unit are f3 and f4, respectively.

* * * * *